(12) United States Patent
Huang et al.

(10) Patent No.: US 8,342,018 B2
(45) Date of Patent: Jan. 1, 2013

(54) HIGH ACCURACY BATTERY-OPERATED MEMS MASS FLOW METER

(75) Inventors: Liji Huang, San Jose, CA (US); Kai Peng, Chengdu (CN); Changming Jiang, Chengdu (CN); Wenhong Deng, Chengdu (CN); Chih-Chang Chen, Cupertino, CA (US)

(73) Assignee: Siargo, Ltd., Santa Clara, CA (US)

( * ) Notice: Subject to any disclaimer, the term of this patent is extended or adjusted under 35 U.S.C. 154(b) by 150 days.

(21) Appl. No.: 12/847,881

(22) Filed: Jul. 30, 2010

(65) Prior Publication Data

US 2012/0024054 A1  Feb. 2, 2012

(51) Int. Cl.
*G01F 1/20* (2006.01)
(52) U.S. Cl. .................................................. 73/204.26
(58) Field of Classification Search ............... 73/204.26, 73/861.351, 866.3; 600/187, 538; 340/870.02
See application file for complete search history.

(56) References Cited

U.S. PATENT DOCUMENTS

| | | | | |
|---|---|---|---|---|
| 6,014,905 A * | 1/2000 | Possati et al. | ................ | 73/866.3 |
| 7,193,265 B2 * | 3/2007 | Peng et al. | ................ | 257/316 |
| 7,880,641 B2 * | 2/2011 | Parris et al. | .............. | 340/870.02 |
| 2009/0158859 A1 * | 6/2009 | Huang et al. | ............. | 73/861.351 |
| 2009/0194719 A1 * | 8/2009 | Mulligan | ................ | 251/129.01 |
| 2009/0270752 A1 * | 10/2009 | Coifman | ................ | 600/538 |
| 2011/0028790 A1 * | 2/2011 | Farr et al. | ...................... | 600/187 |

* cited by examiner

*Primary Examiner* — Jewel V Thompson

(57) ABSTRACT

With increasing demands on data communication and remote control in current industrial processes or gas measurement applications, development of new technologies would be necessary. The current invention presents a MEMS mass flow meter that are cost compatible with conventional variable area flow meters while providing all digital data process including accumulated flow rate measurements, user programmable flow rate alarm and flow data storage. These in-line meters provide packages in pipe diameter from 4 mm up to 100 mm. It is powered with battery and can be used as a stand-alone hand-held option. The meter is also equipped with the industrial standard RS485 Modbus communication interface for easy network and remote management.

6 Claims, 5 Drawing Sheets

HIGH ACCURACY BATTERY-OPERATED MEMS MASS FLOW METER

BACKGROUND OF THE INVENTION

Field of the Invention

The present invention relates to a device and its manufacturing method for measuring mass flow rate of gas according to the preamble of the independent claims. The device invented in the present invention carries numerous advantages over various prior arts with a better accuracy, battery-powered feasibility, and compact package.

One of the most frequently applied variable area flow meters is the rotameter that utilize a float sitting in a tapered tube. When fluid passes through the tube, the float is elevated by the fluid and the distance the float travels is proportional to the fluid flow speed which can be used for volumetric flow calibration. Low cost flow meters have been dominated by rotameters or variable area flow technology. These meters only measure instant volumetric flow rate with a low accuracy. In addition, the meters are not capable for temperature and pressure compensation as well as remote communication.

The rotameters are easy for maintenance and very low cost to make it possible for installation at many applications where cost would be a concern. The rotameters however cannot provide digital data output without incorporating simple conversion devices. This has been a big issue at today's applications that data transmission has become very critical. In addition, it could be easily damaged at a high speed flow pulse that is practically the case when the valves were turned on without additional cautions being applied.

SUMMARY OF THE INVENTION

In recent years, mass flow meters and sensors[1-4] using MEMS (Micro Electro Mechanical System) mass flow sensors manufactured with the silicon micromachined technology have been developed and applied for various applications in medical, environmental and other industries for clean and dry gas mass flow measurement and control. The MEMS mass flow sensors on market mostly operate with the calorimetric principle and packaged in a bypass configuration which is very similar to those by the capillary thermal mass flow technology. However, the sensing elements of the MEMS mass flow sensors are placed on a suspended membrane that is thermally isolated with the gas under measurement providing a much better stability than that in a capillary tube. The fabrication process of the MEMS mass flow sensors is similar to those for state-of-the-art integrated circuitry, and therefore its mass production will substantially reduce the fabrication cost. Furthermore, the MEMS mass flow meters containing the MEMS mass flow sensor and control electronics can be operated at a power as low as sub milliwatt with a average current consumed in a few hundred microamperes. The thermal mass flow meters powered by battery also become possible with the MEMS flow sensors. Nevertheless, the current available products are often costly and only for dry and clean gases, which limit their deployment to those applications where low cost is a critical factor.

In this invention, we present a design of MEMS mass flow meters that are cost-compatible to those by low cost rotameters while providing significant advantages in performance, data communication and installation. It is therefore an object of the present invention to demonstrate such a low cost gas MEMS mass flow meter which is applicable for various flow systems. This object is reached by the independent claims.

In the present preferred embodiments, the silicon micromachined mass flow sensors based on the principles of anemometry and calorimetry are developed. The sensing elements of the flow sensors mainly comprise four serpentine-shape thermistors which are made of same thin film materials with high temperature coefficient of resistance (TCR). One of the thermistors is built as reference thermistor to monitor the ambient temperature while another one of the thermistors is functioned as heater thermistor. In most of cases, the resistance of reference thermistor is several times higher than the heater's. The heater thermistor is elevated to a constant temperature higher than the ambient temperature. A Wheatstone bridge circuit consisting of the heater and reference thermistors is designed to achieve a constant temperature control of heater thermistor. Various materials with high TCR such as Pt, Au, SiC, MgO, and TaN could be as the candidates for thermistors.

In the present preferred embodiments, the heater thermistor is standing on a thermally isolated thin film membrane as the reference resistor is solely located on top of substrate to keep good thermal conductivity to the environment. Both thermistors are encapsulated with a 0.3~0.5 micron thick dielectric film as passivation layer, which is also comprised in the suspended membrane. The fluid speed measurement in the present invention is carried by calorimetric flow sensors. It is usually implemented with a heater thermistor surrounded by two temperature sensing thermistors which are arranged either symmetrically or asymmetrically to the center of heater thermistor. Due to the miniature sizes of heater thermistor and temperature sensing thermistors, the power consumption of such MEMS flow sensors is extremely low compared to conventional hot-wire anemometers. Since the moving fluid continuously carries heat away from the heater thermistor, and thus to change the temperature distribution around the proximate area of heater thermistor. The temperature variation between upstream and downstream area of heater thermistor is measured by the two temperature sensing thermistors. The output signal is interpreted by the voltage output of an unbalanced Wheatstone bridge circuit, in which the downstream and upstream sensing thermistors comprise two of its four branches.

BRIEF DESCRIPTIONS OF THE DRAWINGS

DETAILED DESCRIPTION OF THE PREFERRED EMBODIMENTS

The meters are designed for general purpose industrial gas measurement and monitor. Several serial models cover the mass flow ranges from 0~10 to 0~1000 SLPM and can be customized. The accuracy of all models are designed to be ±(1.5% reading+0.25% full scale) while higher accuracy can be achieved at calibration with a longer straight pipeline to ensure a better flow stability on fabrication as well as field installation.

Figure 1:
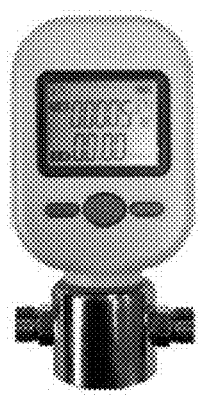
FIG. 1 is a picture of the assembled mass flow meter.
Figure 2:
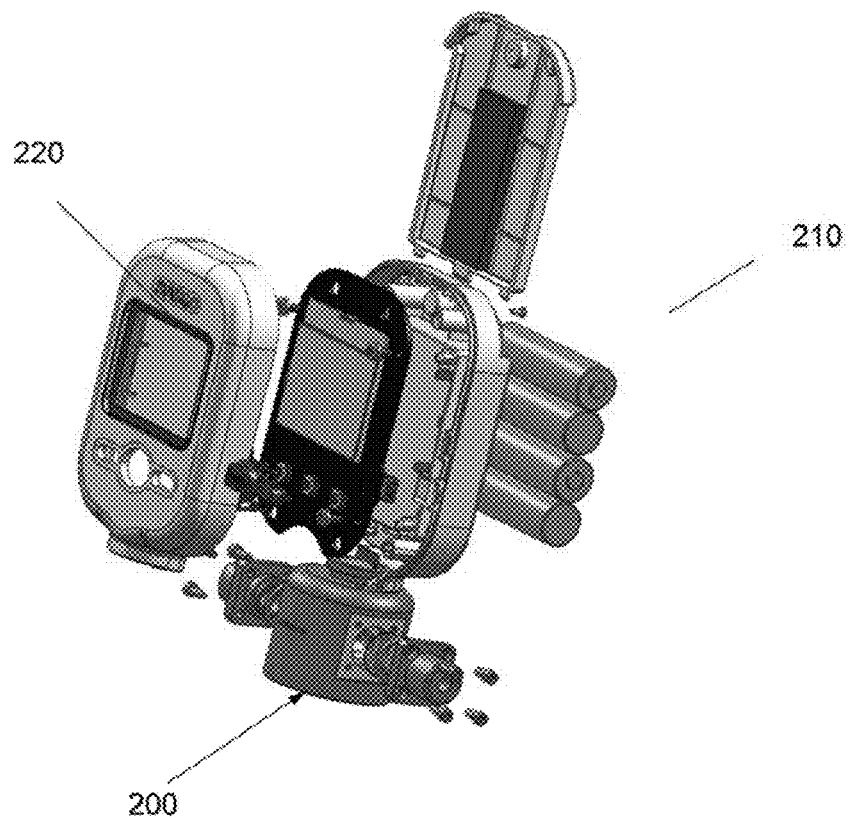
FIG. 2 is an explosive view of the mass flow meter components.

FIG. 1 is a picture of the assembled mass flow meter. FIG. 2 shows the explosive view of the meter components. The meter body 200 is manufactured with copper or other meter materials to be compatible with the requirements of gas safety. The connectors on both ends can be customized to match the pipe threads in specific applications. The meter head is made of polycarbonate. The user interface is through a mini-USB connector providing RS485 Modbus communication and external power supply if desired. In the current design the meter can be powered with 4-AA batteries 210 with an AC adaptor as an optional accessory. The meter can be powered by battery for up to 2000 hours continuously before the power failure alarm sets off. During the operation, the meter will read instant flow, accumulated flow volume, and the fluid temperature through LCD display 220 or RS485 interface as well. The function buttons on the display provide password security for accessing storage data, setting flow alarm, and other functions that can be further explored by enhanced software. Additional wireless network communication software is also available for management on cluster of meters. For the convenience of installation and operation, the meter head can be freely rotated 180° in counter-clockwise and vice versa.

Figure 3:
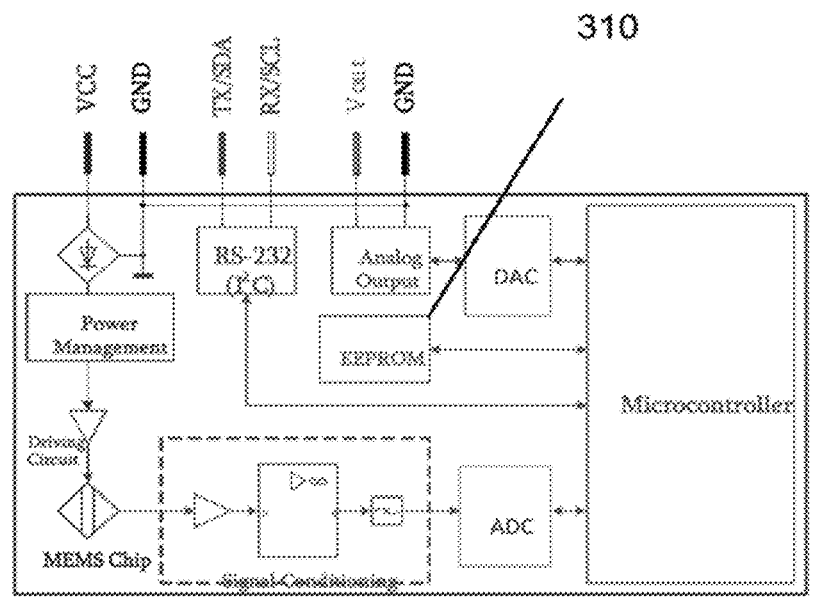
FIG. 3 is a block diagram of the control unit.

FIG. 3 is the block diagram of meter electronics control circuitry. The EPPROM 310 provides the data storage and can be programmed by user for data storage intervals. Up to 3000 items of the data can be stored in the EPPROM 310 and user can access the data via RS485. The total electric current consumed by the circuitry is about 200 μA.

Figure 4:
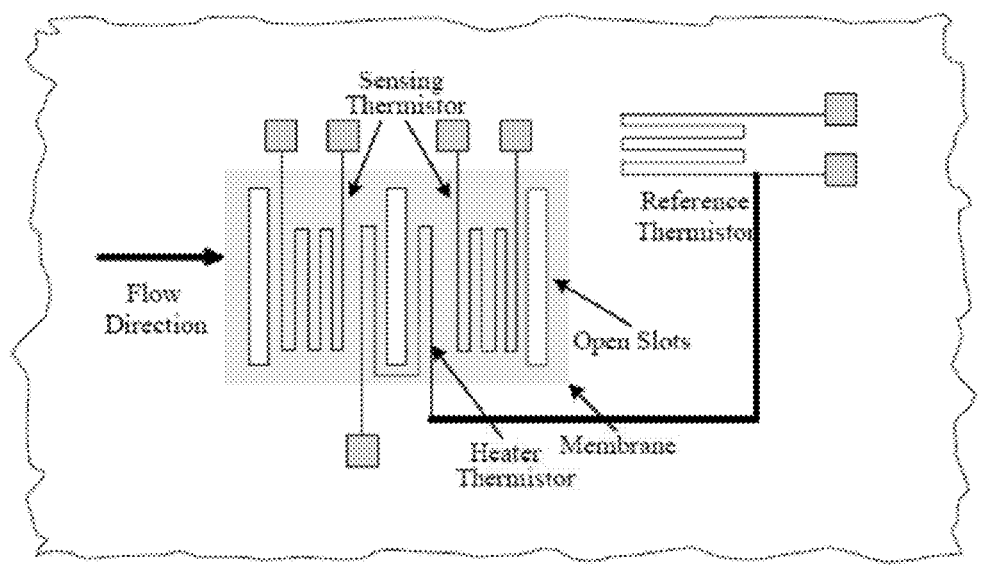
FIG. 4 is the illustration of a preferred sensor topology on top view.

FIG. 4 is the illustration of a preferred sensor topology on top view. The sensor comprises one heater thermistor, one reference thermistor and two temperature sensing thermistors.

Figure 5:
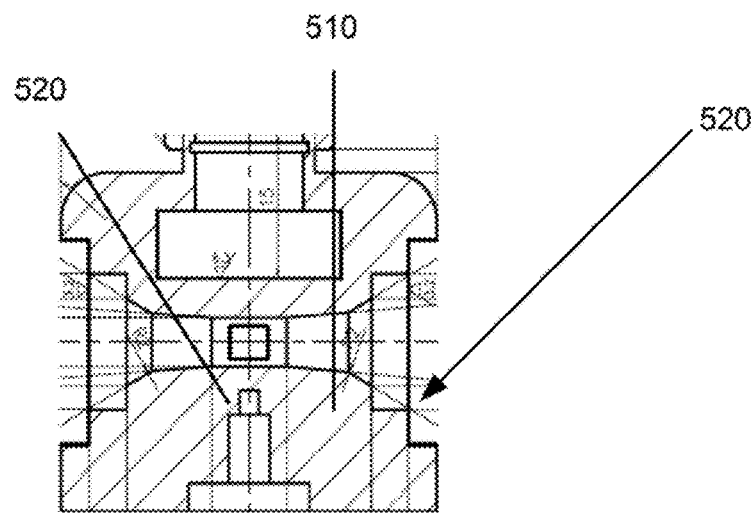
FIG. 5 is the cross section view of flow channel.

FIG. 5 is the cross section view of flow channel. MEMS mass flow sensor 510 mounted on a printed circuit board is located on the top side wall of flow channel. Two Venturi nozzle structures 520 are established respectively on the inlet and outlet ends to reduce the flow turbulence.

Figure 6:
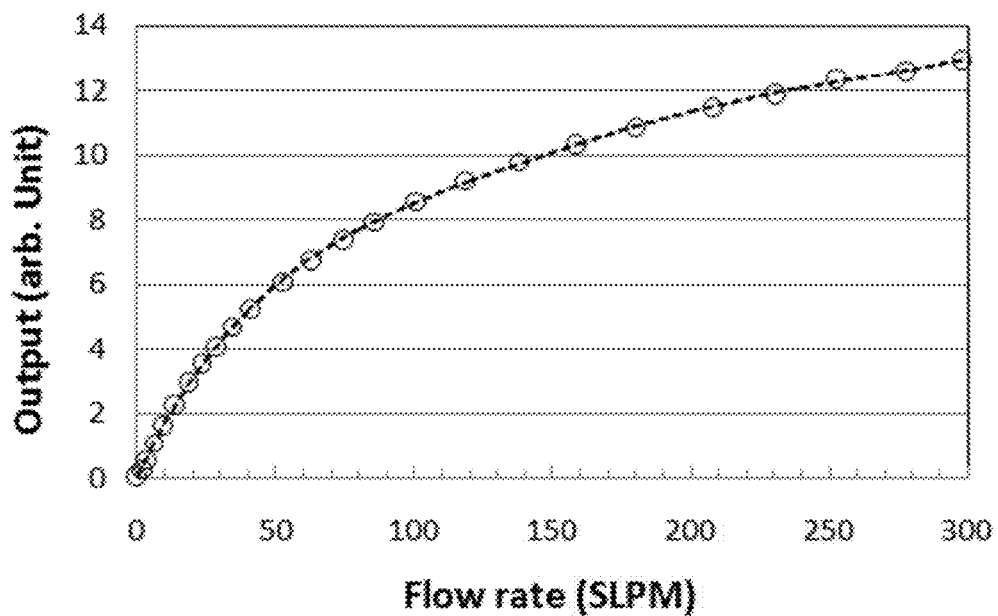
FIG. 6 shows the typical output of the meter (calibration curve) for one model with the flow range of 0~300 SLPM (20° C., 101.325 kPa).

The meters were all calibrated by a sonic nozzle system that has an uncertainty of ±0.2%. The uncertainty of the sonic nozzle was custody transferred via a Bell Prover with an uncertainty of ±0.05%. The measured uncertainties for meters are obtained by another independent sonic nozzle system that has the same uncertainty of the one used for meter calibration. FIG. 6 shows the typical output of the meter (calibration curve) for one model with the flow range of 0~300 SLPM (20° C., 101.325 kPa).

Figure 7:
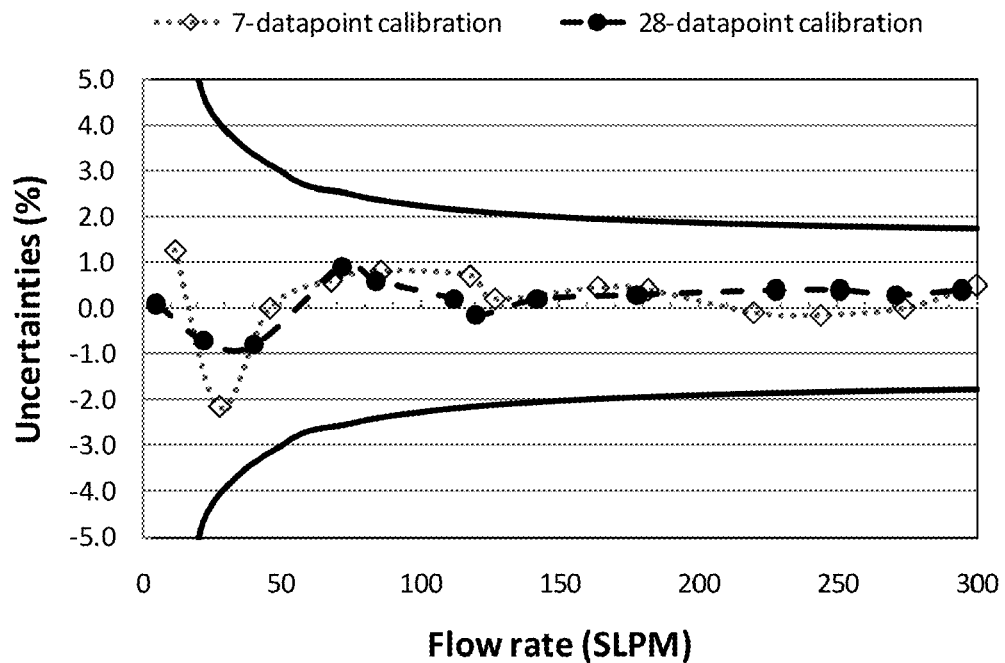
FIG. 7 is the uncertainties measurement comparison for the mass flow meter between 7 and 28 data points calibration.

Calibration usually is the most costive step during the meter manufacturing process as it is very time-consuming if numerous calibration data points have to be collected for each individual meter. Fortunately, as the MEMS sensors are made from the process tools that are similar to those used in today's IC productions which ensures the uniformity and high consistency from each sensor chip. Based on the manufacturing database, we found that most of the sensors output similar curves that can be proximate with a fourth order polynomial. This then allows significant reduction of calibration data collection which could lead to a low cost for fabrication. FIG. 7 shows two measurements of the uncertainties from a same meter under two different sets of 7 and 28 calibration data points respectively. The error band boundaries are shown by the solid lines in the figure. It is apparent that both calibration methods could give similar results that both the uncertainties are well within the specified accuracy as discussed above.

One of the advantages in capillary thermal mass flow sensing technology is that a gas conversion factor can be applied as the flow channel of the meter can be designed such that the fluid flowing through the bypass and main channel carries very similar properties (usually in laminar flow conditions). This enables the meter calibrated with one fluid can be easily applied for measurement of another flow medium without additional calibration which is very critical for many industrial applications. The MEMS mass flow sensors, on the other hand, are manufactured on silicon wafer that could allow the sensor to be packaged into a plate assembly. This sensor assembly using our insertion meter design is a plate with a thickness less than 1 mm and the plate surface is placed in parallel to the fluid flow direction. It therefore will possibly force the fluid redistributing from the plate edge of the sensor assembly into laminar flow according to the fluidic boundary layer theory. If this is the case, this redistribution of the flow into laminar flow at the MEMS sensor assembly will be independent on the initial flow formality and the fluid composition, which suggest that we might as well apply a gas conversion factor to the flow meter being calibrated for an arbitrary medium, e.g. nitrogen gas, when measuring another gas using the same MEMS meter.

Figure 8:
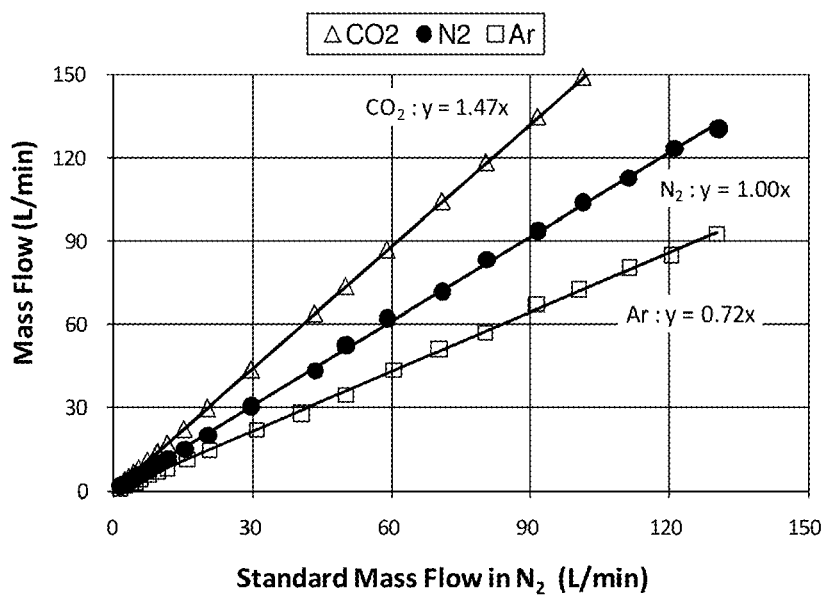
FIG. 8 is the output of a meter calibrated with $N_2$ while applied for Ar and $CO_2$, respectively.

To verify this assumption and obtain such factors for the MEMS meters in the present work, the meters were first calibrated with the nitrogen gas and then applied for measurement of the argon and carbon dioxide at the same temperature and pressure (20° C., 101.325 kPa). A differential pressure volumetric meter with ±0.5% accuracy was deployed as a reference meter. FIG. 8 shows the data of the measurement. One can observe that when the gas is not the nitrogen (calibration gas), the outputs are deviated from the original volumetric value but are linear against the reference volumetric flow value. Thus the experimental data demonstrate the gas conversion factor can be used for the current MEMS flow meters.

Figure 9:
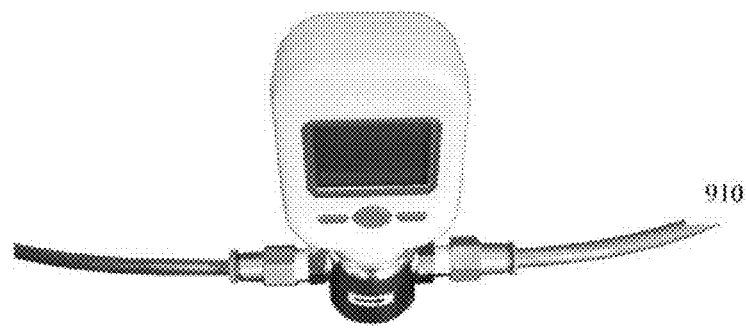
FIG. 9 is shown the meter connected with two flexible tubing.
Figure 10:
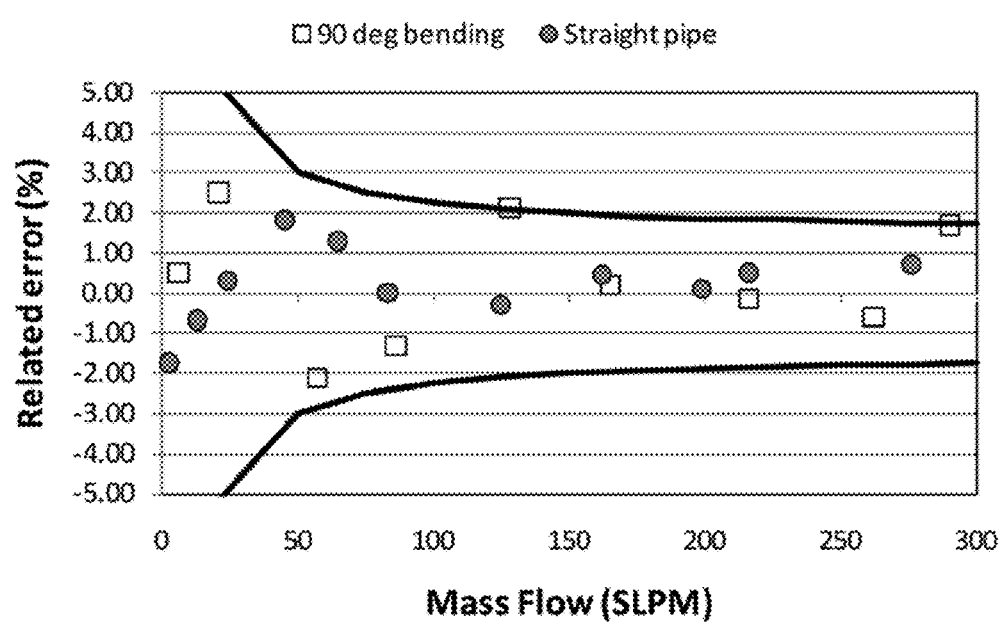
FIG. 10 is the accuracy measurement for flexible pipe connection.

As the meters are designed for general purpose of industrial applications, the installation should be as easy as possible and a plug-and-pay installation would be preferred. FIGS. 9 and 10 shows the measurement accuracy for a test configuration that the meters are installed into one-touch connectors at both ends with the flexible plastic tube 910. The flexible tube 910 can be bended at arbitrary angles for tests of the flow stability through the meter body in which the flow channel has a Venturi nozzle structure in both inlet and outlet ends to reduce flow turbulence. A flow conditioner is installed at the inlet in front of the Venturi nozzle structure as well. At the upstream of the meter, a standard differential pressure flow meter used as the reference which was connected to a straight pipeline with a length of about 50 times of the pipe diameter. At the 90 degree bending of the flexible tube 910, the data shown in FIG. 10 indicated that all the tested data were within the specified accuracy band, which further ensures the plug-and-play character of this meter.

Compared to the capillary thermal mass flow meters, the MEMS mass flow meter discussed in the present invention also features a significant characteristic of low pressure loss that is comparable to that of the variable area flow meters. For example, for the 0~10 L/min model, the pressure loss is only about 420 Pa at the maximum flow. This is particularly important for low pressure applications. Because of the package advantages, similar pressure loss can also be achieved for higher flow models.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

We claim:

1. A high accuracy battery-operated MEMS mass flow meter comprising:
   a MEMS mass flow sensor mounted on an ultra thin printed circuit board which is within a thickness less than 0.5 mm and the printed circuiy board is inserted into a as flow channel with its surface placed in parallel to the fluid flow direction; wherein said ultra thin printed circuit board can force fluid redistributing, from ultra thin printed circuit board's edge into a laminar flow according to fluidic boundary layer theory; wherein said fluid redistributing can provide measuring flow medium variability by applying conversion factors to different flow medium based on a calibration of single flow medium,
   a meter head with a 180° rotation freedom, which has a LCD display that can exhibit an instant mass flow rate, an accumulated flow volume, and flow medium temperature; and a gas flow channel with two Venturi nozzle structures are established respectively on its inlet and outlet ends to reduce the flow turbulence.

2. The high accuracy battery-operated MEMS mass flow meter of claim 1 wherein
   said meter head and said MEMS mass flow sensor can be both powered by four AAA batteries or an external power source.

3. The high accuracy battery-operated MEMS mass flow meter of claim 1 wherein
   The total electric current consumed by a circuitry of said meter bead and said MEMS mass flow meter is less than 200 $\mu$A.

4. The high accuracy battery-operated MEMS mass or meter of claim 1 wherein
   said meter head has an user interface through a mini-USB connector providing RS485 Modbus communication.

5. The high accuracy battery-operated MEMS mass flow meter of claim 1 wherein
   said meter head has a EPPROM which can store calibration data and gas conversion factors up to 3000 items and can be programmed by user for data storage periods.

6. The high accuracy battery-operated MEMS mass flow meter of claim 5 wherein
   said EPPROM can be programmed by user for data storage periods; and said data storage can be accessed through RS485.

* * * * *